(12) United States Patent
Asahara et al.

(10) Patent No.: US 8,717,736 B2
(45) Date of Patent: May 6, 2014

(54) LIGHTNING PROTECTION FASTENER AND MOUNTING METHOD THEREOF

(71) Applicant: Mitsubishi Aircraft Corporation, Aichi (JP)

(72) Inventors: Yuji Asahara, Tokyo (JP); Hideo Yamakoshi, Tokyo (JP); Atsuhiro Iyomasa, Tokyo (JP); Wataru Nishimura, Tokyo (JP); Takeyasu Tarumi, Tokyo (JP); Yasunori Watanabe, Tokyo (JP); Toru Hashigami, Aichi (JP); Hiroshi Rikukawa, Tokyo (JP); Hideo Imamura, Tokyo (JP); Naoki Taniguchi, Aichi (JP)

(73) Assignee: Mitsubishi Aircraft Corporation, Aichi (JP)

( * ) Notice: Subject to any disclaimer, the term of this patent is extended or adjusted under 35 U.S.C. 154(b) by 0 days.

(21) Appl. No.: 13/738,152

(22) Filed: Jan. 10, 2013

(65) Prior Publication Data

US 2013/0186552 A1 Jul. 25, 2013

(30) Foreign Application Priority Data

Jan. 17, 2012 (JP) ................................. 2012-007469

(51) Int. Cl.
*H05F 3/00* (2006.01)
(52) U.S. Cl.
USPC .......................................................... 361/218
(58) Field of Classification Search
USPC ........................................................... 361/218
See application file for complete search history.

(56) References Cited

U.S. PATENT DOCUMENTS

| 4,826,380 | A | * | 5/1989 | Henry ............................ 411/377 |
| 4,971,745 | A | * | 11/1990 | Ferenc et al. .................. 264/263 |
| 2011/0226896 | A1 | * | 9/2011 | Bessho et al. ................. 244/1 A |

FOREIGN PATENT DOCUMENTS

JP 2010-254287 A 11/2010

* cited by examiner

*Primary Examiner* — Ronald W Leja
(74) *Attorney, Agent, or Firm* — Pearne & Gordon LLP (57) ABSTRACT

A sealant 34 filled into a cap 30A is caused to overflow through both an opening in a first end portion 30a of the cap 30A and a through-hole 40 of the cap 30A when the cap 30A is pressed against a fastener member 25. With regard to the cap 30A, a ratio between inside diameter D1 of the opening on the side of the first end portion 30a and hole diameter D2 of the through-hole 40 in the second end portion 30b is set as follows: $0.10 \le D2/D1 \le 0.27$.

14 Claims, 10 Drawing Sheets

LIGHTNING PROTECTION FASTENER AND MOUNTING METHOD THEREOF

BACKGROUND OF THE INVENTION

1. Field of the Invention

The present invention relates to a lightning protection fastener used for an airframe of an aircraft, and especially for wings, as well as to a method for mounting the lightning protection fastener.

2. Description of the Related Art

Each wing of an airframe of an aircraft generally has a hollow structure and a wing panel forming a wing surface is fixed to a structural member in the wing by using fastener members (fasteners).

In so doing, the wing panel and structural member are fastened together by passing a pin-shaped fastener member, from outside the wing, through through-holes formed in both the wing panel and the structural member in the wing and fixing a front-end portion of the fastener member with a fastening member (collar) from inside the wing.

Besides, in the wings and a fuselage, structural members other than the wing panels as well as fixing members for equipment are fixed and fastened by the fastener members.

In so doing, the pin-shaped fastener member is inserted by passing through respective through-holes formed in two members to be fastened together, and the front-end portion of the fastener member is fixed by the fastening member (collar), thereby fastening the two members together.

Incidentally, the number of the members such as the wing panel to be fixed is not limited to two.

For aircraft, thorough measures need to be taken against lightning for the purpose of explosion proofing. When an aircraft is struck by lightning, resulting in large current flowing through the wing panels and structural members of the main wings and the like, part or in some cases, all of the current flows through portions fastened by the fastener members and fastening members. Discharges known as electrical arcs (or thermal sparks) occur (hereinafter referred to as arcs) in any fastened portion where a value of the current exceeds a limit value of an allowable passing current. This is a phenomenon in which due to the current passing through the fastened portion, sudden temperature rises occur on a fastening interface of members constituting the fastened portion and mainly including conductive members, locally melting the members and producing sparks in the surrounding atmosphere. In many cases, molten material known as hot particles scatter from the molten portion. Internal spaces of wings, which generally combine fuel tanks, need to be provided with explosion-proof measures. Therefore, it is necessary to prevent arc discharges by suppressing generation of arcs or sealing arcs at the time of a lightning strike as well as to prevent ignition by keeping scattering hot particles from coming in contact with inflammable fuel vapor. Here, parts likely to contain inflammable fuel vapor include the insides of fuel tanks in the wings and fuselage, the insides of surge tanks (tanks in which vent scoops or burst disks are installed) generally installed on the wing tip side of the fuel tanks, the insides of fuel-system equipments, and the like.

Thus, a configuration is proposed in which, as shown in FIG. 7, a cap 3 made of an insulating material is mounted, covering a front-end portion 1a of a fastener member 1 and a metal fastening piece 2 fastened to the fastener member 1, with filling a sealant 4 into the cap 3, thereby closing a gap between the cap 3 and the front-end portion 1a of the fastener member 1 and the metal fastening piece 2 (see, for example, Japanese Patent Laid-Open No. 2010-254287).

Figure 7A:
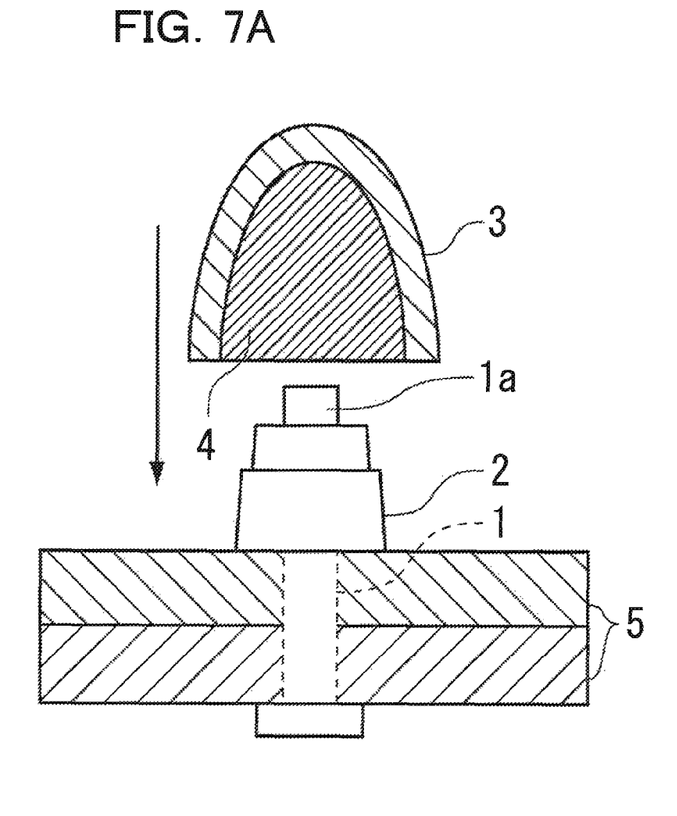
FIGS. 7A to 7D are sectional views showing a conventional lightning protection fastener.
Figure 7B:
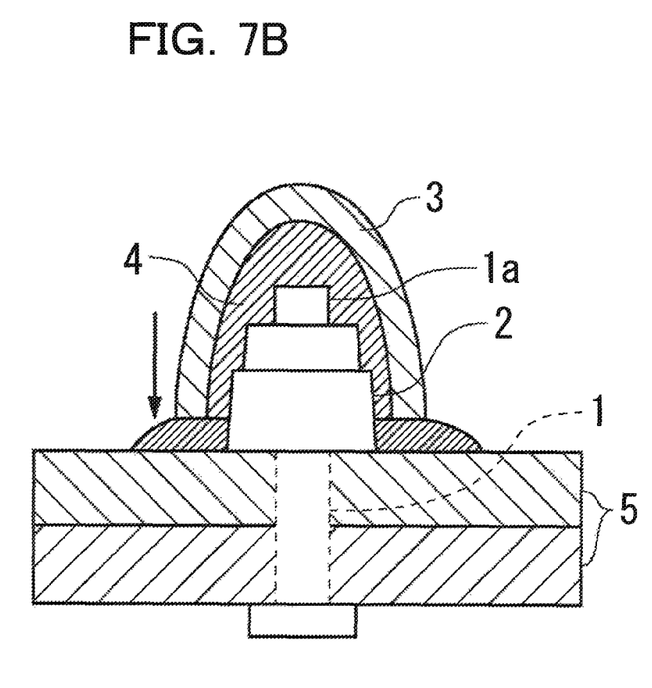
Figure 7C:
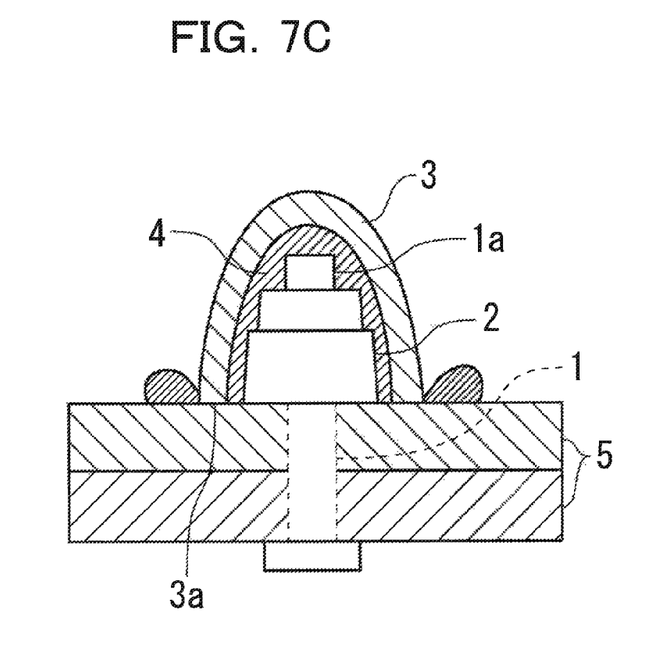

In a fastening worksite where the fastener member 1 is used, as shown in FIG. 7A, the sealant 4 is filled into an internal space of the cap 3 before the cap 3 is mounted on the front-end portion 1a of the fastener member 1 and the metal fastening piece 2. Then, as shown in FIG. 7B, the cap 3 filled with the sealant 4 is put on the front-end portion 1a of the fastener member 1 and the metal fastening piece 2. Thereupon excessive sealant 4 in the cap 3 spills out of the cap 3 through an opening in the cap 3. As shown in FIG. 7C, when an end face 3a of the cap 3 on the opening side is pressed against a surface of a member 5 such as a wing panel, the spilt sealant 4 exists in the form of an annular bulge on an outer peripheral side of the cap 3 while being interposed between the cap 3 and member 5, thereby arks are confined at an interface between the cap 3 and member 5.

SUMMARY OF THE INVENTION

The sealant 4 such as described above has high viscosity. Therefore, if a gap between the end face 3a of the cap 3 on the opening side and the member 5 such as a wing panel is reduced in final stages of mounting the cap 3, it becomes difficult for the sealant 4 to spill out through the gap, increasing the pressure of the sealant 4 held between the cap 3 and the member 5 such as a wing panel.

Figure 7D:
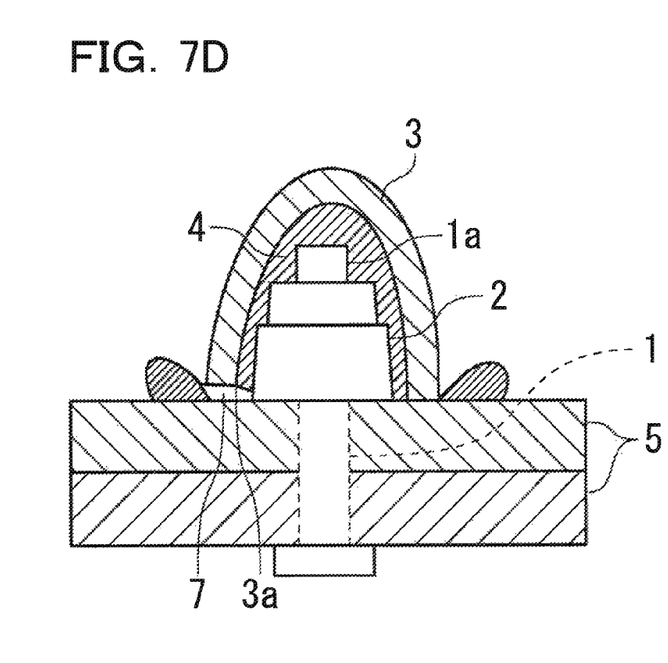

Also, the sealant 4 has elasticity in addition to viscosity. Consequently, there is a problem that even if the cap 3 is pressed against the member 5 such as a wing panel as shown in FIG. 7D, the pressed cap 3 is pushed back in the direction away from the member 5 by the above-described pressure and an elastic force.

When the cap 3 is pushed back and the end face 3a of the cap 3 on the opening side is away from the member 5 such as a wing panel, a gap 7 is produced here, making it impossible to confine arcs.

Also, the cap 3 may in some cases float up and the sealant 4 interposed between the end face 3a of the cap 3 and the member 5 such as a wing panel becomes thinner in a radial direction of the cap 3. This case is also undesirable because it may become impossible to confine arcs reliably between the cap 3 and the member 5 such as a wing panel.

The present invention has been accomplished in view of these technical problems and has an object to provide a lightning protection fastener and a method for mounting the lightning protection fastener which can prevent a cap from floating up and reliably confine arcs.

A lightning protection fastener according to the present invention accomplished with this object comprises: a fastener member for fastening a second member to a first member which constitutes an airframe of an aircraft and the fastener member having a shaft which penetrates the first member and the second member and protrudes on a side of at least one of the first member and the second member; a fastening member mounted on the fastener member shaft which protrudes on the side of at least one of the first member and the second member; a cap made of an insulating material and the cap being mounted so as to cover the fastener member shaft and the fastening member, the fastener member shaft protruding on the side of at least one of the first member and the second member; and a sealant made of an insulating material and filled into the cap to close a space between the cap and the fastener member and the fastening member. The cap includes an opening adapted to house the fastener member shaft and the fastening member as well as a through-hole formed in a wall surface of the cap, and inside diameter $D1$ of the cap on the end portion side of the opening which faces the first member or the second member and hole diameter D2 of the through-hole are configured to satisfy $$0.10 \leq D2/D1 \leq 0.27$$

With this configuration, when the cap is mounted, the sealant filling the cap can be caused to spill out of the cap through both the opening of the cap and the through-hole by pressing the cap filled with the sealant against the fastener member shaft and the fastening member.

Preferably the through-hole is formed in a top of the cap or in a location closer to the top of the cap than the fastening member.

Also, preferably a tubular member extending outwardly of the cap is formed around the through-hole.

With this configuration, the sealant overflowing through the through-hole is housed in the tubular member, keeping the fingers of workers who mount the cap free from the sealant.

Also, preferably an openable and closable lid adapted to cover the through-hole is formed on the cap. Such a lid may have any configuration. For example, outside diameter of the lid may be smaller than inside diameter of the through-hole, and part of the lid in a circumferential direction may be integrally coupled to the cap.

Such a lid enables the sealant overflowing through the through-hole to change its flow direction, thereby flowing along an outer surface of the cap.

The present invention also relates to a method for mounting the lightning protection fastener described above, comprising the steps of: passing the fastener member through the first member and the second member, protruding the fastener member shaft on a side of at least one of the first member and the second member, and mounting the fastening member on the fastener member shaft; and mounting the cap so as to cover the fastener member shaft and the fastening member, the fastener member protruding on the side of at least one of the first member and the second member and the cap having been filled with the sealant in advance. Here, in the step of mounting the cap, the sealant filled into the cap is caused to spill out of the cap through both the opening and the through-hole by pressing the cap toward the fastener member shaft and the fastening member.

According to the present invention, when the cap is mounted, the cap is pressed against the fastener member shaft and the fastening member, and the sealant filled into the cap is caused to spill out of both the opening and through-hole, making it possible to prevent the pressure of the sealant in the cap from becoming excessively high, prevent the cap from floating up, and thereby reliably confine arcs.

DETAILED DESCRIPTION OF THE PREFERRED EMBODIMENTS

The present invention will be described in detail below with reference to embodiments shown in the accompanying drawings.

First Embodiment

Figure 1:
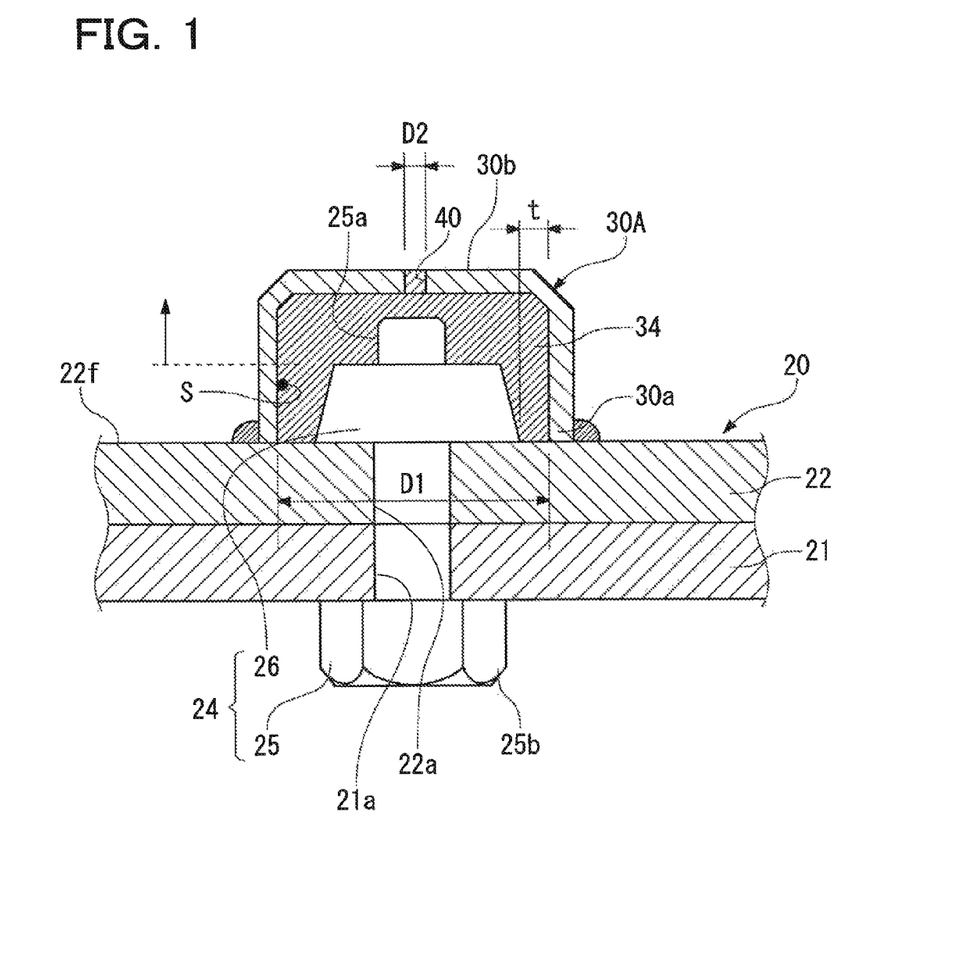
FIG. 1 is a sectional view showing a configuration of a lightning protection fastener according to a first embodiment.

FIG. 1 is a sectional view of part of a wing constituting an airframe of an aircraft to which a lightning protection fastener according to an embodiment of the present invention is applied.

As shown in FIG. 1, an outer shell of a wing 20 is formed from an wing panel (first member) 21 made, for example, of CFRP (Carbon Fiber Reinforced Plastics), which is a composite material of carbon fiber and resin, or a metal material such as aluminum alloy. Being provided in the wing 20, structural members for reinforcement, fuel tanks, and various instruments are fixed to the wing panel 21 via members (second member) 22 such as stays made of a metal material such as aluminum alloy. The members 22 such as stays are mounted on the wing panel 21 by fasteners 24.

The fastener 24 includes a pin-shaped fastener member 25 and a collar (fastening member) 26 attached to the fastener member 25 on an inner side of the wing 20.

Generally, the fastener member 25 and collar 26 are made of metal material from the viewpoint of strength. The pin-shaped fastener member 25 has a thread groove 25a formed in a front-end portion. A rear-end portion is an expanded-diameter portion 25b larger in diameter than on the side of the front-end portion. The fastener member 25 is inserted from outside the wing 20 into a hole 21a formed by penetrating the wing panel 21 and a hole 22a formed by penetrating the member 22. Then, while the expanded-diameter portion 25b in the rear-end portion is butted against an outer surface of the wing panel 21, the front-end portion protrudes into the wing 20.

The collar 26 has a tubular shape, and a thread groove designed to mesh with the thread groove 25a on the fastener member 25 is formed on an inner circumferential surface of the collar 26. The collar 26 is screwed onto the thread groove 25a in the fastener member 25 protruding into the wing 20. Consequently, the wing panel 21 and member 22 are held between the expanded-diameter portion 25b of the fastener member 25 and the collar 26, with the member 22 being fixed to the wing panel 21.

On the side of internal space of the wing 20, a cap 30A is mounted on the fastener 24. The cap 30A is pre-filled with a sealant 34 having insulating properties.

The cap 30A has a closed-end tubular shape which is circular in cross section, open on the side of a first end portion 30a, and closed on a second end portion 30b (the top of the cap).

The cap 30A has a through-hole 40 formed in the top (second end portion 30b). Incidentally, the through-hole 40 may be formed not only in the top of the cap 30A, but also in another location as long as the location is closer to the top of the cap 30A than the collar 26 (above the dotted line in FIG. 1).

The cap 30A may be formed in advance from insulating material of the same type as the sealant 34. For example, the cap 30A can be made of insulating resin such as PPS (polyphenylene sulfide resin), polyimide, PEEK (polyether ether ketone resin), or nylon resin.

The inside diameter of the cap 30A on its inner circumferential surface is set such that a predetermined gap will be formed between the fastener member 25 and collar 26 when the cap 30A is mounted on the fastener 24.

When the cap 30A is mounted on the fastener 24, the cap 30A is filled with the insulating sealant 34. The sealant 34 is interposed between the inner circumferential surface of the cap 30A and the fastener member 25 and collar 26.

Even if the cap 30A is mounted on the fastener 24 by leaning to one side, resulting in an extremely small gap t between the inner circumferential surface of the cap 30A and the collar 26, since the cap 30A made of insulating material has been formed to have a predetermined thickness, arcs can be confined reliably.

In the first end portion 30a, i.e., on the open side of the cap 30A, in addition to a predetermined thickness of the cap 30A, since the sealant 34 is present between the inner circumferential surface of the cap 30A and the fastener member 25 and collar 26, arcs can be confined more reliably between the inner circumferential surface of the cap 30A and the fastener member 25 and collar 26.

To mount the cap 30A on the fastener 24 which fastens together the wing panel 21 and the member 22, first the fastener member 25 is passed through the wing panel 21 and member 22, and then the collar 26 is mounted on the front-end portion of the fastener member 25.

Then, the cap 30A is pre-filled with uncured sealant 34. At this time, a generous amount of sealant 34 needs to be filled such that the sealant 34 will overflow through the through-hole 40 and first end portion 30a of the cap 30A when the cap 30A is pressed against the fastener member 25 as described later. Thus, preferably a mark S or the like configured to indicate a fill level of the sealant 34 is put on the inner circumferential surface of the cap 30A.

In the internal space of the wing 20, the cap 30A pre-filled with the sealant 34 in this way is pressed against the fastener member 25 of each fastener 24 protruding inward.

Consequently, the sealant 34 filled into the cap 30A overflows through an opening in the first end portion 30a of the cap 30A as well as through the through-hole 40. This enables to keep down the pressure of the sealant 34 in the cap 30A and prevent the cap 30A from being pushed back in the direction away from the member 22. This eases cap 30A mounting operations.

Also, the sealant 34 overflowing through the opening in the first end portion 30a of the cap 30A is interposed between the first end portion 30a of the cap 30A and a surface 22f of the member 22. Furthermore, the sealant 34 spreads annularly on an outer peripheral side of the first end portion 30a of the cap 30A. This enables to further improve arc confinement performance at an interface between the cap 30A and member 22 and to configure a lightning protection fastener with high reliability.

Also, when the sealant 34 filled into the cap 30A cures, the cap 30A mounted fastener 24 is configured as a lightning protection fastener. Preferably any surplus sealant 34 overflowing from the through-hole 40 is wiped off.

The sealant 34 filled into the cap 30A overflows through both the opening in the first end portion 30a of the cap 30A and the through-hole 40 of the cap 30A when the cap 30A is pressed against the fastener member 25 as described above. This enables to prevent the pressure of the sealant 34 from becoming excessively high, prevent the cap 30A from floating up, and thereby reliably confine arcs.

Preferably, with regard to the cap 30A described above, a ratio between inside diameter D1 of the opening on the side of the first end portion 30a and hole diameter D2 of the through-hole 40 in the second end portion 30b is set as follows:

$$0.10 \leq D2/D1 \leq 0.27$$

Figure 2:
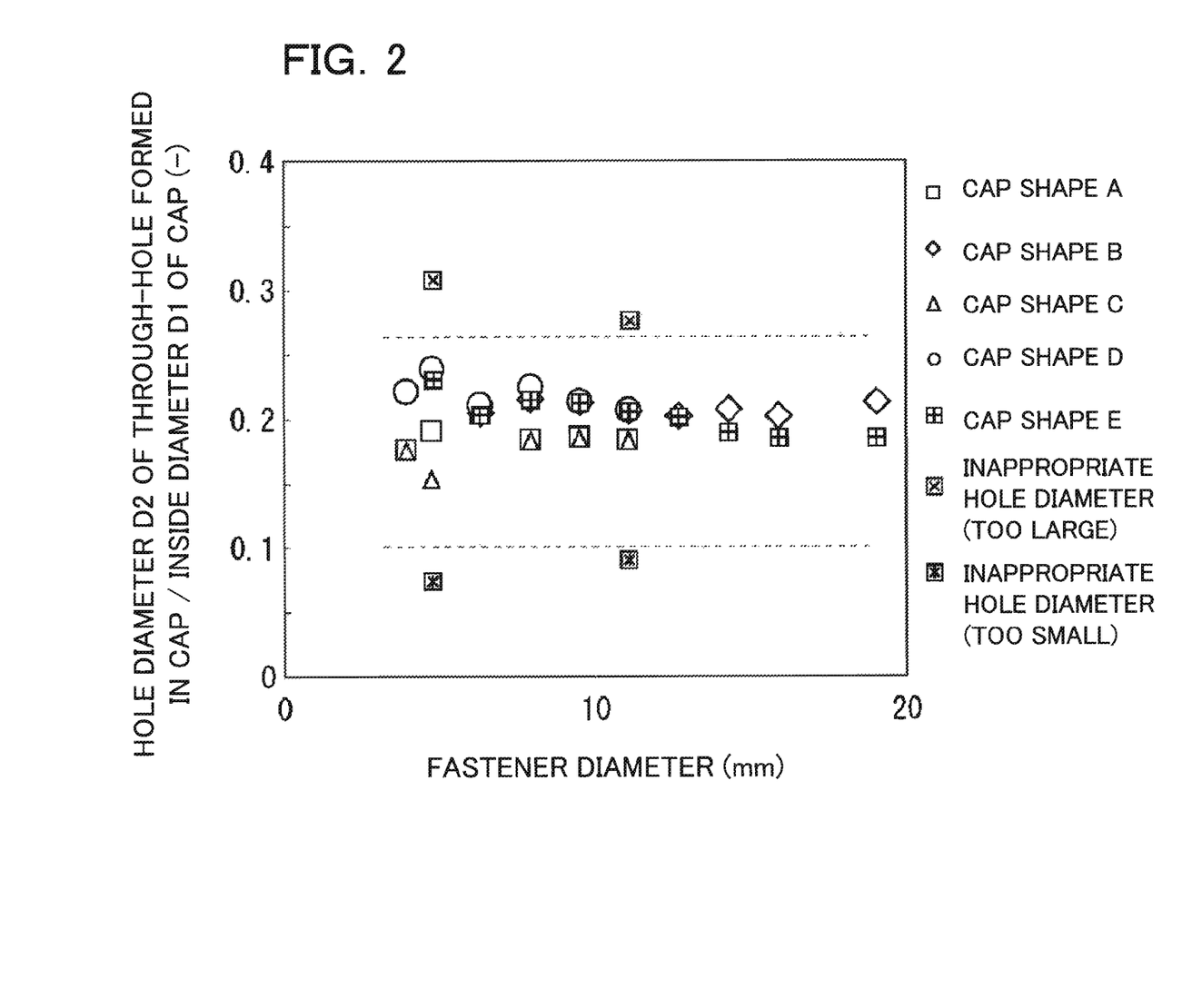
FIG. 2 is a diagram showing results obtained by simulation and actual measurements.

This was determined based on results produced as follows. A study was conducted based on a simulation performed using caps 30A of plural shapes, where the ratio between the inside diameter D1 of the opening on the side of the first end portion 30a and the hole diameter D2 of the through-hole 40 in the second end portion 30b was set in and out of the above range and the caps 30A were filled with a sealant 34 whose viscosity was set to $2 \times 10^2$ to $2 \times 10^4$ (Pa/s) and were mounted on the fastener 24. Also, evaluations were made by actually mounting caps 30A filled with the sealant 34 on the fastener 24. The results are shown in FIG. 2.

The simulation described above was run based on simplified calculations of pressure losses using the Hagen-Poiseuille equation by simulating a flow of the sealant 34 to non-Newtonian flow while ignoring a "compression elasticity" term. More specifically, the hole diameter of the through-hole 40 was caused to converge using iterative calculations such that pressure losses at the opening on the side of the first end portion 30a and the through-hole 40 in the second end portion 30b would be balanced with pressure of a mounting load required to mount the cap 30A on the fastener 24.

That is, (1) Set a flow rate (Q) at the opening on the side of the first end portion 30a and the through-hole 40 in the second end portion 30b.

(2) Calculate a loss of pressure caused in the through-hole 40 and a loss of pressure caused in the gap between the cap 30A and member 22.

(3) Determine a flow ratio which will equalize the loss of pressure in the through-hole 40 with the loss of pressure in the gap between the cap 30A and member 22.

(4) Calculate volumes of outflow through the through-hole 40 and through the gap between the cap 30A and member 22.

(5) Determine a maximum mounting load by multiplying the pressure losses by the bore area of the cap 30A.

(6) Repeat (2) to (5) to determine the through-hole 40 which will equalize the maximum mounting load found in (5) with an allowable load.

(7) Determine leakage amounts of the sealant 34 through the through-hole 40 and through the gap between the cap 30A and member 22.

As shown in FIG. 2, when D2/D1 is less than 0.10, the hole diameter of the through-hole 40 is too small for the sealant 34 to overflow smoothly through the through-hole 40. This increases the pressure of the sealant 34 in the cap 30A during mounting the cap 30A. Consequently, the load required to mount the cap 30A increases, and the phenomenon in which the cap 30A floats up due to residual pressure becomes conspicuous after the mounting.

On the other hand, when D2/D1 is more than 0.27, an amount of sealant 34 overflowing through the through-hole 40 becomes too large while an amount of sealant 34 overflowing through the first end portion 30a of the cap 30A is decreased. Consequently, the sealant 34 does not spread annularly around the first end portion 30a of the cap 30A, and the sealant 34 does not overflow through the first end portion 30a of the cap 30A in some locations. This could make the effect of arc confinement insufficient around the first end portion 30a of the cap 30A.

In contrast, if D2/D1 is kept within the above range, the above problems are eliminated, and the sealant 34 can be caused to overflow through both the through-hole 40 and first end portion 30a of the cap 30A, achieving a good arc confinement effect. A more preferable range of "D2/D1" is $0.15 \leq D2/D1 \leq 0.25$.

Second Embodiment

A second embodiment of the lightning protection fastener and the cap for the lightning protection fastener according to the present invention will be shown next. Components different from the first embodiment will mainly be described below: common components with the first embodiment described above are denoted by the same reference numerals in drawings as the corresponding components in the first embodiment, and description thereof will be omitted.

Figure 3A:
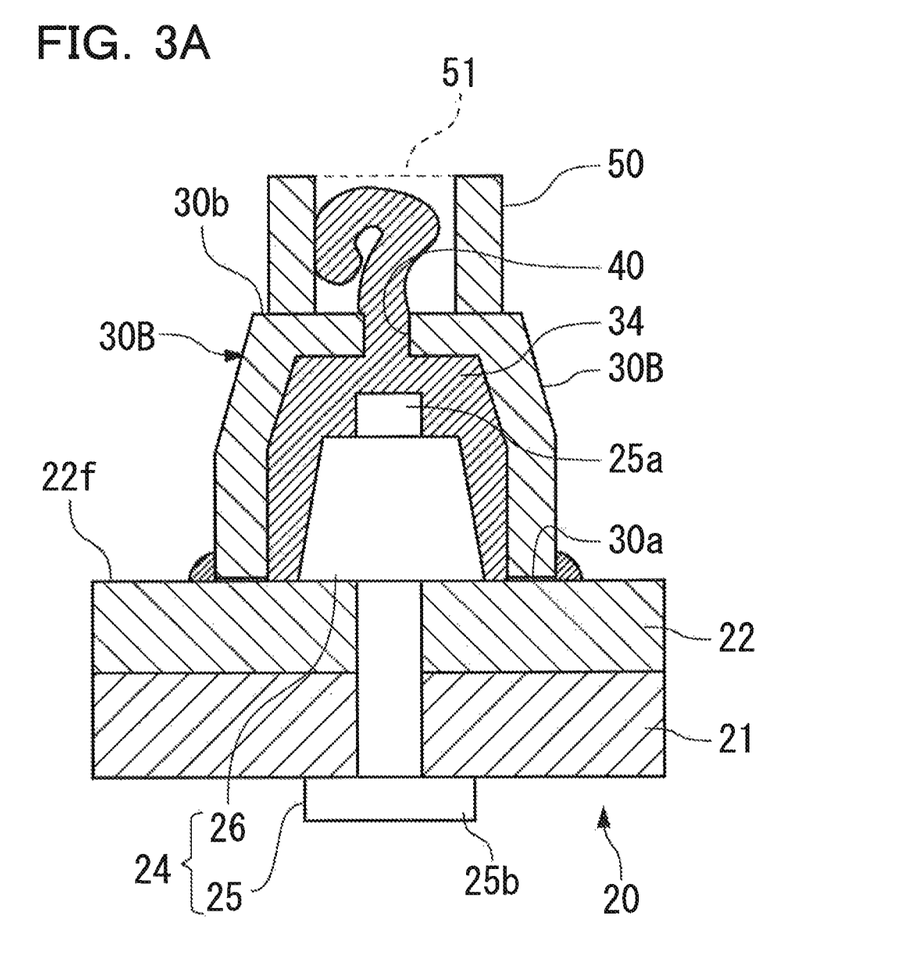
FIGS. 3A and 3B are sectional views showing a configuration of a lightning protection fastener according to a second embodiment.

As shown in FIG. 3A, compared to the cap 30A according to the first embodiment, a cap 30B according to the present embodiment has a tubular body 50 provided on an outer periphery of the through-hole 40.

In mounting the cap 30B on the fastener member 25, the tubular body 50 allows the sealant 34 overflowing through the through-hole 40 to be accommodated in the tubular body 50. This enables to keep the fingers of workers who mount the cap 30B free from the sealant 34, improving operating efficiency.

Also, if a front-end portion of the tubular body 50 is closed by adhesive tape, film 51, or the like, the sealant 34 will be kept from flowing out of the tubular body 50. This makes the above effect more prominent.

Figure 3B:
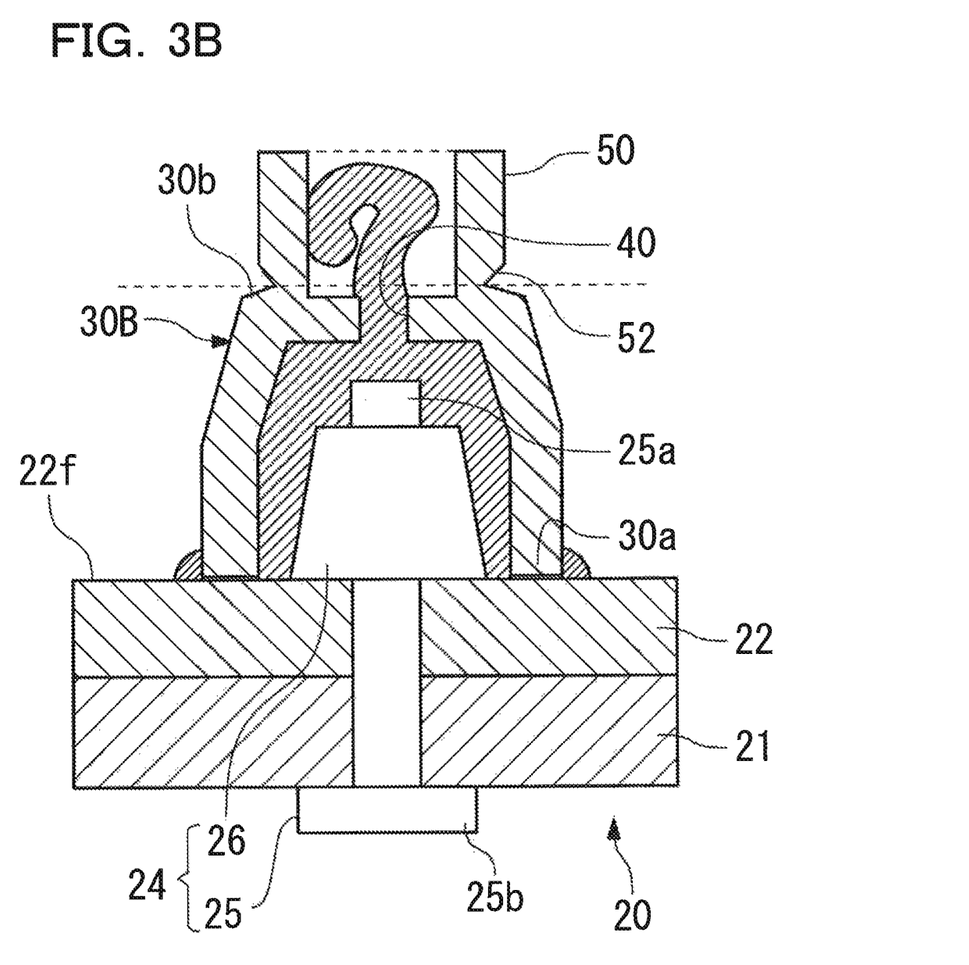

Furthermore, preferably a groove 52 continuous in a circumferential direction is formed at a root of the tubular body 50 as shown in FIG. 3B. This will allow the unnecessary tubular body 50 to be cut off at the location of the groove 52 (location of a dotted line in FIG. 3B).

Figure 4:
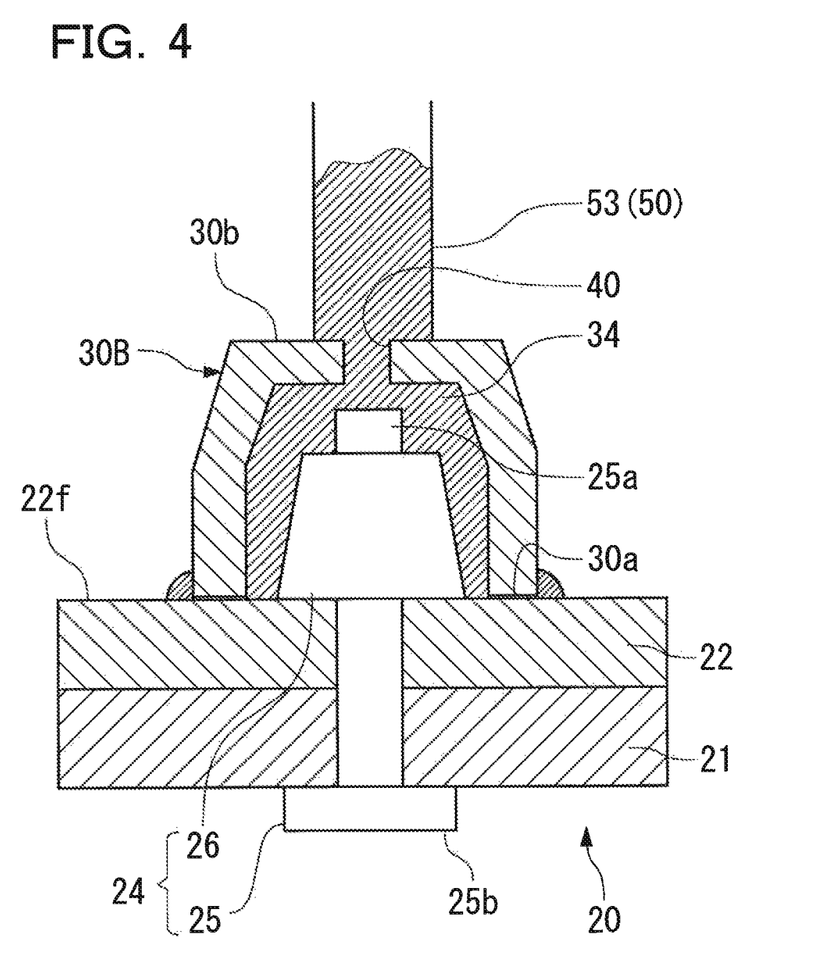
FIG. 4 is a sectional view showing a variation of the lightning protection fastener according to the second embodiment.

In addition, a tube 53 may be used as the tubular body 50 as shown in FIG. 4.

Third Embodiment

A third embodiment of the lightning protection fastener and the cap for the lightning protection fastener according to the present invention will be shown next. Components different from the first embodiment will mainly be described below: common components with the first embodiment described above are denoted by the same reference numerals in drawings as the corresponding components in the first embodiment, and description thereof will be omitted.

Figure 5A:
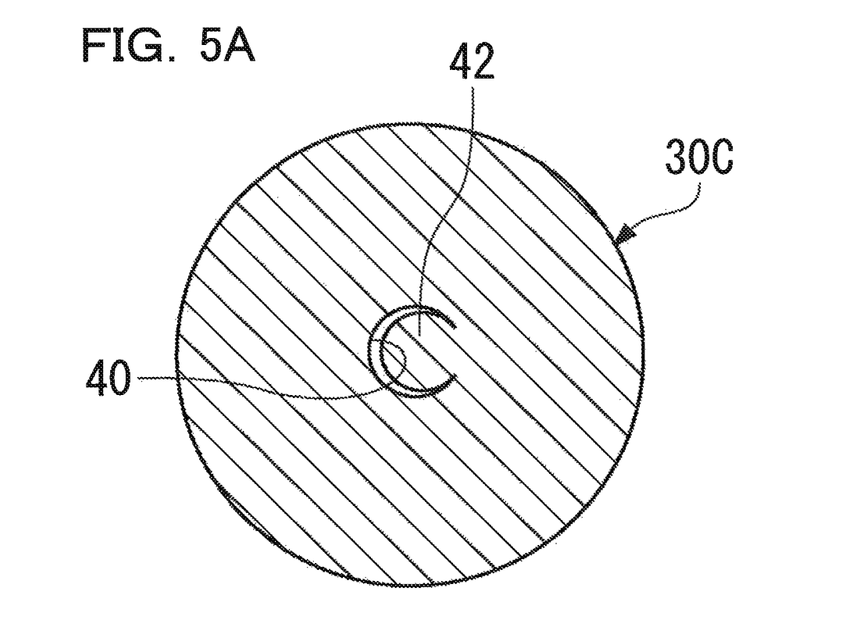
FIG. 5A is a plan view of a cap for the lightning protection fastener shown in FIG. 5C.
Figure 5B:
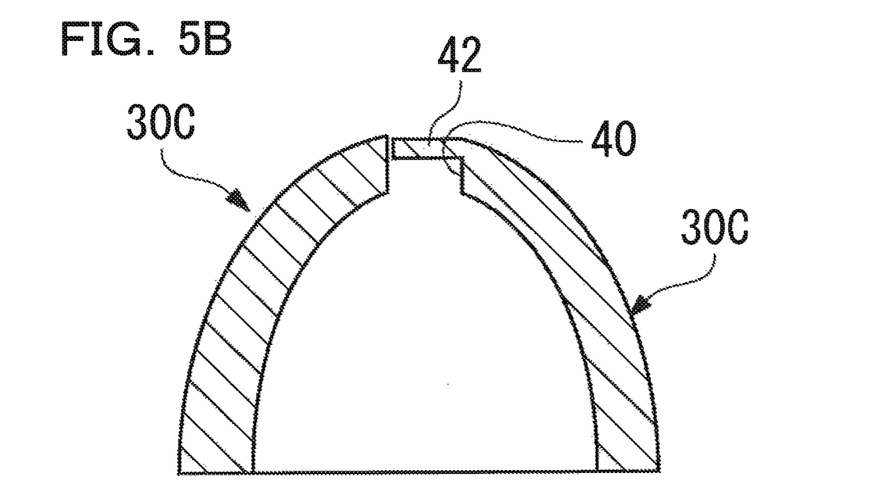
FIG. 5B is a sectional view of the cap.

As shown in FIGS. 5A and 5B, a cap 30C according to the present embodiment has a lid 42 provided on the through-hole 40, where the lid 42 is smaller in thickness than the cap 30C around the through-hole 40. The lid 42 has an outside diameter smaller than the hole diameter of the through-hole 40, and part of the lid 42 in the circumferential direction is integrally coupled to the cap 30C.

Figure 5C:
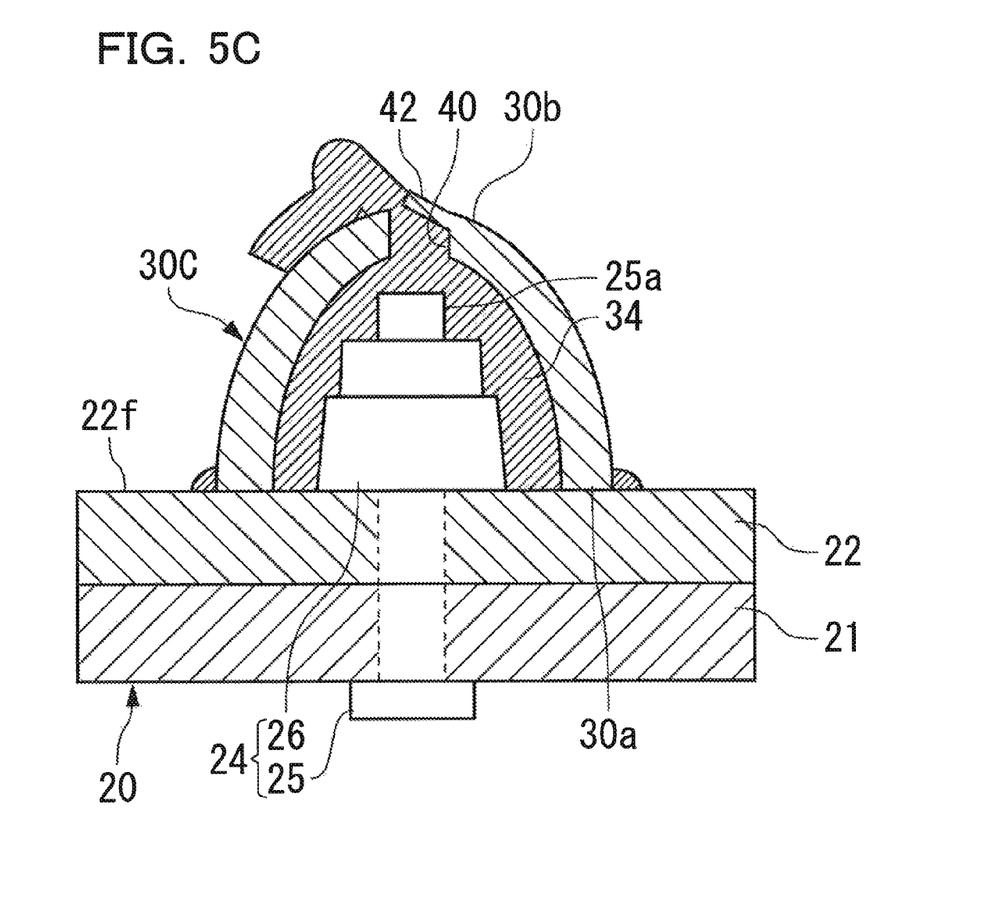
FIG. 5C is a sectional view showing a configuration of a lightning protection fastener according to a third embodiment.

As shown in FIG. 5C, when the cap 30C is mounted on the fastener member 25, the lid 42 described above changes a flow direction of the sealant 34 overflowing through the through-hole 40. This makes it difficult for the overflowing sealant 34 to drip to the surroundings since it flows along an outer circumferential surface of the cap 30C.

Also, when the overflowing sealant 34 is wiped off, the sealant 34 in the through-hole 40 is covered by the lid 42, securing a predetermined insulation thickness.

Note that the caps 30A, 30B, and 30C may have any external shape in the respective embodiments described above. For example, the caps may have a cross sectional shape represented by a quadratic curve or the like with the outside diameter decreasing gradually from the first end portion 30a toward the second end portion 30b as in the case of the cap 30C.

Figure 6A:
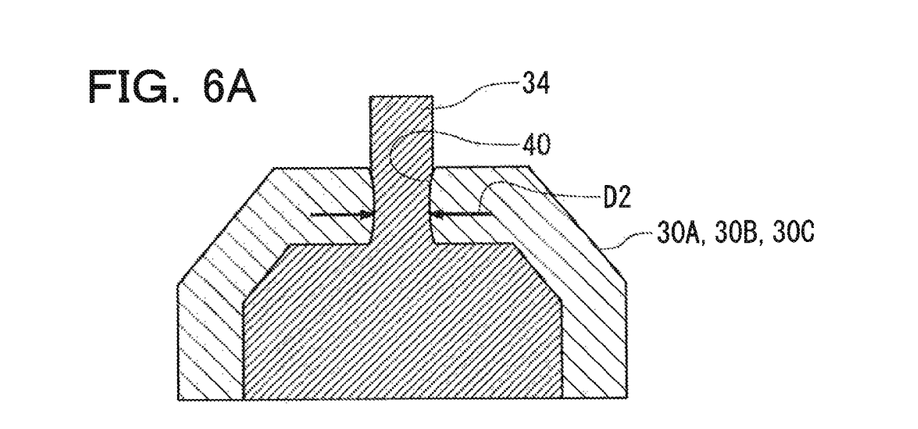
FIGS. 6A to 6C are diagrams showing variations of a through-hole formed in the cap.
Figure 6B:
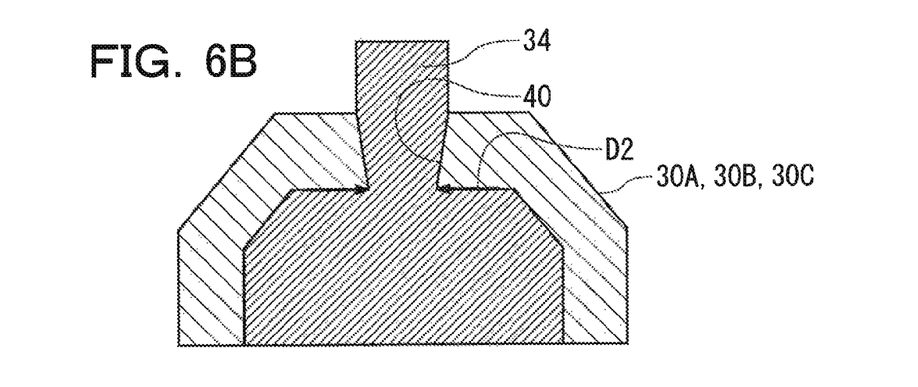
Figure 6C:
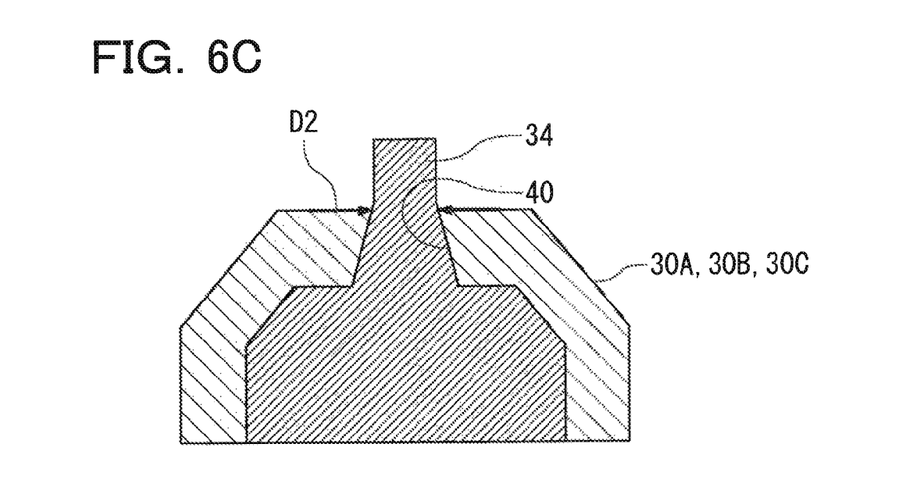

Also, regarding the cross sectional shape of the through-hole 40, available shapes include a constricted shape with the hole diameter being reduced in a midsection as shown in FIG. 6A, an inverse tapered shape with the inner circumference increasing gradually from the inner side toward the outer side of the cap 30A, 30B, or 30C as shown in FIG. 6B, and a tapered shape with the inner circumference decreasing gradually from the inner side toward the outer side of the cap 30A, 30B, or 30C as shown in FIG. 6C. As shown in FIGS. 6A to 6C, when the cross sectional shape of the through-hole 40 changes, the hole diameter of the most constricted part (i.e., the minimum hole diameter of the through-hole 40) is designated as D2.

Although the above embodiments are configured such the wing panel 21 and member 22 are fastened by the fastener 24, the fastener 24 and the caps 30A, 30B, and 30C may be applied to any other part. Also, the fastener member 25 of the fastener 24 may be protruded on opposite sides of two members, and the cap 30A, 30B, or 30C may be provided on the two sides.

Besides, some of the components cited in the above embodiments may be left out or changed as appropriate without departing from the gist of the present invention.

DESCRIPTION OF SYMBOLS

20 Wing
21 Wing panel (first member)
22 Member (second member)
24 Fastener
25 Fastener member
26 Collar (fastening member)
30A, 30B, 30C Cap
30a First end portion (open end portion) of cap
30b Second end portion (top) of cap
34 Sealant
40 Through-hole
42 Lid
50 Tubular body
51 Film
52 Groove
53 Tube

What is claimed is:

1. A lightning protection fastener comprising:
    a fastener member for fastening a second member to a first member which constitutes an airframe of an aircraft and the fastener member having a shaft which penetrates the first member and the second member and protrudes on a side of at least one of the first member and the second member;
    a fastening member mounted on the fastener member shaft which protrudes on the side of at least one of the first member and the second member;
    a cap made of an insulating material and the cap being mounted so as to cover the fastener member shaft and the fastening member; and
    a sealant made of an insulating material and filled into the cap to fill any space between the cap and the fastener member and the fastening member,
    wherein the cap includes an opening adapted to house the fastener member shaft and the fastening member as well as a through-hole formed in a wall surface of the cap, and inside diameter D1 of the cap on the side of an end portion of the opening which faces the first member or the second member and hole diameter D2 of the through-hole are configured to satisfy $0.10 \leq D2/D1 \leq 0.27$, wherein after installation of the cap, the sealant completely fills the space between the cap and the fastener member and the fastening member, and part of the sealant spills out of the cap through the through-hole.

2. The lightning protection fastener according to claim 1, wherein the through-hole is formed in a top of the cap or in a location closer to the top of the cap than the fastening member.

3. The lightning protection fastener according to claim 1, wherein a tubular member extending outwardly of the cap is formed around the through-hole.

4. The lightning protection fastener according to claim 3, wherein:
the tubular member is formed integrally with the cap; and
a groove continuous in a circumferential direction is formed at a root of the tubular member.

5. The lightning protection fastener according to claim 1, wherein an openable and closable lid adapted to cover the through-hole is formed on the cap.

6. The lightning protection fastener according to claim 5, wherein outside diameter of the lid is smaller than inside diameter of the through-hole, and part of the lid in a circumferential direction is integrally coupled to the cap.

7. The lightning protection fastener according to claim 2, wherein the through-hole and a lid are formed on the top of the cap.

8. The lightning protection fastener according to claim 1, wherein the sealant spilled out of the cap through the through-hole also constitutes the lightning protection fastener.

9. A lightning protection fastener comprising:
a fastener member for fastening a second member to a first member which constitutes an airframe of an aircraft and the fastener member having a shaft which penetrates the first member and the second member and protrudes on a side of at least one of the first member and the second member;
a fastening member mounted on the fastener member shaft which protrudes on the side of at least one of the first member and the second member;
a cap made of an insulating material and the cap being mounted so as to cover the fastener member shaft and the fastening member; and
a sealant made of an insulating material and filled into the cap to fill any space between the cap and the fastener member and the fastening member,
wherein the cap includes an opening adapted to house the fastener member shaft and the fastening member as well as a through-hole formed in a wall surface of the cap, and
wherein after installation of the cap, the sealant completely fills the space between the cap and the fastener member and the fastening member, and part of the sealant spills out of the cap through the through-hole.

10. The lightning protection fastener according to claim 9 wherein the opening and the through-hole are each configured to allow sealant to spill out of the cap during installation of the cap.

11. The lightning protection fastener according to claim 9, wherein the sealant spilled out of the cap through the through-hole also constitutes the lightning protection fastener.

12. A lightning protection fastener comprising:
a fastener member for fastening a second member to a first member which constitutes an airframe of an aircraft and the fastener member having a shaft which penetrates the first member and the second member and protrudes on a side of at least one of the first member and the second member;
a fastening member mounted on the fastener member shaft which protrudes on the side of at least one of the first member and the second member;
a cap made of an insulating material and the cap being mounted so as to cover the fastener member shaft and the fastening member; and
a sealant made of an insulating material and filled into the cap to fill any space between the cap and the fastener member and the fastening member,
wherein the cap includes an opening adapted to house the fastener member shaft and the fastening member as well as a through-hole formed in a wall surface of the cap, and
wherein an openable and closable lid adapted to cover the through-hole is formed on the cap.

13. The lightning protection fastener according to claim 12, wherein outside diameter of the lid is smaller than inside diameter of the through-hole, and part of the lid in a circumferential direction is integrally coupled to the cap.

14. The lightning protection fastener according to claim 12, wherein the through-hole and the lid are formed on the top of the cap.

* * * * *